US009569763B2

(12) United States Patent
Clifford et al.

(10) Patent No.: US 9,569,763 B2
(45) Date of Patent: Feb. 14, 2017

(54) INFORMATION GATHERING AND DECODING APPARATUS AND METHOD OF USE

(75) Inventors: Harold Clayton Clifford, Eugene, OR (US); Paul Duggan, Rotherfield (GB); Bruce Paris, Eugene, OR (US); Jeff Robson, Eugene, OR (US); Michael John Webb, Eugene, OR (US); Alexander M. McQueen, Eugene, OR (US); Jonathan Paul Hewitt, Watford (GB); Gianfranco Tibaldi, Bologna (IT); Daniela Tangerini, Bologna (IT)

(73) Assignee: DATALOGIC USA, INC., Eugene, OR (US)

( * ) Notice: Subject to any disclaimer, the term of this patent is extended or adjusted under 35 U.S.C. 154(b) by 464 days.

(21) Appl. No.: 12/488,267

(22) Filed: Jun. 19, 2009
(Under 37 CFR 1.47)

(65) Prior Publication Data

US 2010/0257063 A1    Oct. 7, 2010

Related U.S. Application Data

(60) Provisional application No. 61/138,900, filed on Dec. 18, 2008, provisional application No. 61/074,584, filed on Jun. 20, 2008.

(51) Int. Cl.
*G06G 1/12*     (2006.01)
*G06Q 20/20*    (2012.01)

(52) U.S. Cl.
CPC ............ *G06Q 20/20* (2013.01); *G06Q 20/202* (2013.01)

(58) Field of Classification Search
CPC .................................................. G06Q 20/202
(Continued)

(56) References Cited

U.S. PATENT DOCUMENTS 4,939,355 A     7/1990   Rando et al.
5,029,183 A *   7/1991   Tymes ........................ 375/141
(Continued)

FOREIGN PATENT DOCUMENTS

WO      WO-98/38589 A1    9/1998

OTHER PUBLICATIONS

Carlo, "Home Depot Draws the Line on Checkout Congestion—Introduces Wireless Scanner Technology—Brief Article," http:findarticles.com/p/articles/mi_m0VCW/is_13_27/ai_76759028/?ta . . . Jul. 2, 2001.
(Continued)

*Primary Examiner* — Hunter Wilder
(74) *Attorney, Agent, or Firm* — Stoel Rives LLP

(57) ABSTRACT

An information gathering and decoding apparatus includes two information gathering devices that communicate with one another, preferably wirelessly. The two information gathering devices may be used substantially simultaneously to process one, or multiple, customer orders. Customer order information is sent from one information gathering device to the other, and only one of the information gathering devices communicates with a computer system to send information from both of the information gathering devices to the computer system as if the information originated from the one information gathering device. Communication between the two information gathering devices combined with a microprocessor in at least one of the information gathering devices may allow the information gathering and decoding apparatus to be used with existing computer systems, such as point of sale systems, preferably without modifying the computer system. One information gathering device may pre-qualify customers to purchase restricted items. The second information gathering device may access the pre-
(Continued)

qualification from the first information gathering device to process sales of restricted items to customers.

12 Claims, 12 Drawing Sheets

(58) Field of Classification Search
USPC .................................................... 705/16, 21
See application file for complete search history.

(56) References Cited

U.S. PATENT DOCUMENTS

| | | | |
|---|---|---|---|
| 5,177,345 A * | 1/1993 | Baitz ............................... 186/61 |
| 5,182,441 A * | 1/1993 | Chadima et al. ........ 235/462.45 |
| 5,198,650 A * | 3/1993 | Wike, Jr. ................. 235/462.45 |
| 5,214,270 A | 5/1993 | Rando |
| 5,272,324 A * | 12/1993 | Blevins .................... 235/462.44 |
| 5,276,680 A * | 1/1994 | Messenger .................... 370/311 |
| 5,316,107 A * | 5/1994 | Wieschemann et al. ....... 186/61 |
| 5,375,680 A * | 12/1994 | Ikeda et al. ..................... 186/61 |
| 5,393,965 A * | 2/1995 | Bravman et al. ............. 235/383 |
| 5,804,807 A * | 9/1998 | Murrah et al. ................ 235/383 |
| 5,978,772 A * | 11/1999 | Mold .............................. 705/16 |
| 5,984,182 A * | 11/1999 | Murrah et al. ................ 235/383 |
| 6,024,284 A * | 2/2000 | Schmid et al. .......... 235/462.46 |
| 6,179,206 B1 * | 1/2001 | Matsumori .................... 235/383 |
| 6,216,951 B1 * | 4/2001 | Swift et al. ............. 235/462.45 |
| 6,286,756 B1 | 9/2001 | Stinson et al. |
| 6,513,015 B2 | 1/2003 | Ogasawara |
| 6,543,683 B2 * | 4/2003 | Hoffman ....................... 235/375 |
| 6,550,582 B2 * | 4/2003 | Addy et al. ..................... 186/61 |
| 6,775,033 B1 * | 8/2004 | Nobuta et al. ................ 358/468 |
| 6,856,964 B1 * | 2/2005 | Sadler ............................ 705/16 |
| 6,860,427 B1 * | 3/2005 | Schmidt et al. ......... 235/462.32 |
| 6,974,083 B1 | 12/2005 | Kahn et al. |
| 7,114,656 B1 | 10/2006 | Garver |
| 7,251,634 B1 * | 7/2007 | Foss et al. ...................... 705/64 |
| 7,303,128 B2 * | 12/2007 | Canipe et al. ............ 235/462.01 |
| 7,341,185 B1 * | 3/2008 | Arrington et al. ............ 235/383 |
| 7,546,250 B1 * | 6/2009 | Brosnan et al. ................ 705/16 |
| 7,575,161 B2 * | 8/2009 | Nguyen et al. ............... 235/383 |
| 7,762,458 B2 * | 7/2010 | Stawar et al. ................. 235/383 |
| 7,883,012 B2 | 2/2011 | Tabet et al. |
| 7,885,645 B2 * | 2/2011 | Postma et al. ................. 455/417 |
| 8,694,435 B1 * | 4/2014 | Bishop ................. G06Q 20/202 |
| | | | 705/21 |
| 2002/0042753 A1 * | 4/2002 | Ortiz et al. ...................... 705/26 |
| 2002/0143643 A1 * | 10/2002 | Catan ............................. 705/26 |
| 2002/0190128 A1 * | 12/2002 | Levine et al. ............ 235/462.13 |
| 2003/0065568 A1 * | 4/2003 | Kondo et al. .................... 705/19 |
| 2003/0121974 A1 * | 7/2003 | Blanford et al. ............. 235/383 |
| 2003/0234288 A1 * | 12/2003 | Canipe et al. ................ 235/383 |
| 2004/0107167 A1 * | 6/2004 | Maari ............................ 705/57 |
| 2004/0118928 A1 * | 6/2004 | Patel et al. ............... 235/472.01 |
| 2004/0181679 A1 * | 9/2004 | Dettinger et al. ............. 713/193 |
| 2005/0103852 A1 * | 5/2005 | Lucera et al. ............ 235/462.14 |
| 2005/0242177 A1 * | 11/2005 | Roberge et al. .............. 235/383 |
| 2005/0268003 A1 * | 12/2005 | Wang et al. .................... 710/36 |
| 2006/0208056 A1 * | 9/2006 | Tennison et al. ............. 235/375 |
| 2006/0249584 A1 * | 11/2006 | Bobba et al. ............ 235/462.39 |
| 2006/0289654 A1 * | 12/2006 | Robinson et al. ....... 235/462.46 |
| 2007/0057034 A1 * | 3/2007 | Gauthier et al. ............. 235/375 |
| 2007/0088903 A1 * | 4/2007 | Choi ............................. 711/100 |
| 2007/0138260 A1 | 6/2007 | Keys |
| 2007/0236467 A1 * | 10/2007 | Marshall et al. ............. 345/173 |
| 2007/0282677 A1 * | 12/2007 | Carpenter ....................... 705/14 |
| 2008/0015940 A1 * | 1/2008 | Sadler ............................ 705/16 |
| 2008/0033880 A1 | 2/2008 | Fiebiger et al. |
| 2008/0073430 A1 * | 3/2008 | Sickenius ...................... 235/383 |
| 2008/0087724 A1 | 4/2008 | Kobres et al. |
| 2008/0109260 A1 * | 5/2008 | Roof ................................. 705/3 |
| 2008/0217411 A1 * | 9/2008 | Ledwith et al. ......... 235/472.02 |
| 2008/0314969 A1 * | 12/2008 | Hussey .......................... 235/375 |
| 2009/0020611 A1 * | 1/2009 | Sackett et al. ........... 235/462.08 |
| 2009/0048917 A1 * | 2/2009 | Blake et al. ..................... 705/14 |
| 2009/0076405 A1 * | 3/2009 | Amurthur et al. ............ 600/529 |
| 2009/0101717 A1 * | 4/2009 | Claessen ................. 235/462.13 |
| 2009/0204504 A1 * | 8/2009 | De Araujo et al. ............. 705/21 |
| 2009/0296899 A1 * | 12/2009 | Beason et al. .................. 379/45 |
| 2010/0258634 A1 * | 10/2010 | Takahashi ................ 235/472.01 |
| 2010/0320272 A1 * | 12/2010 | Carlson et al. .......... 235/462.07 |

OTHER PUBLICATIONS

Moin, "The Limited Way," http://0-proquest.umi.com.catalog.multicolib.org/pdqweb?index=0&sid=1&srchmode=2&v . . . , Jan. 9, 2004.
"Food Lion Launches Portable Shopping System by Symbol Technologies and Agilysis at New Concept Store," http://www.symbol.com/news/pressreleases/food_lion_launches_pps.html, May 27, 2004.
"Cash Bases Recruits Epson for New Queue Busting Product," http://www.pos.epson.co.uk/news-and-events/newsletters/spring03/cashbases.htm, accessed Feb. 15, 2008.
"Queue-Busting at Woolworths," http://www.maxatec-europe.com/content/pages/company/case-studies/items/queue-busting-retailers.shtml, accessed Feb. 15, 2008.
"Fujitsu Testing U-Scan Shopper Smart Shopping Cart," http://www.engadget.com/2005/02/22/fujitsu-tsting-u-scan-shopper-smart-shopping-cart/, Feb. 22, 2005.
IRISYS, Tesco 'One-in-Front' Campaign Wins Prestigious Retail Week Award Using IRISYS Queue Busting Camera Technology, Mar. 2, 2006.
Service on the Spot, "Mobile Queue Busting Systems for Improved Customer Loyalty and Sales," 2007.
Home Channel News, "Home Depot Draws the Line on Checkout Congestion—Introduces Wireless Scanner Technology—Brief Article," http://findarticles.com/p/articles/mi_m0VCW/is_13_27/ai_76759028/?ta . . . , Jul. 2, 2001.
Proquest, "The Limited Way," http://0-proquest.umi.com.catalog.multcolib.org/pqdweb?index=0&sid=1&srchmode=2&v . . . , Jan. 9, 2004.
Food Lion, "Food Lion Launches Portable Shopping System by Syme Technologies and Agilysis at New Concept Store," http://www.symbol.com/news/pressreleases/food_lion_launches_pps.html, Apr. 27, 2004.
Epson, "Cash Bases Recruits Epson for New Queue Busting Product," http://www.pos.epson.co.uk/news-and-events/newsletters/spring03/cashbases.htm, accessed Feb. 15, 2008.
Extech Instruments, "Queue-Busting at Woolworth's," http://www.maxatec-europe.com/content/pages/company/case-studies/items/queue-bsuting-retailers.shtml, accessed Feb. 15, 2008.
Engadget, "Fujitsu Testing U-Scan Shopper Smart Shopping Cart," http://www.engadget.com/2205/02/22/fujitsu-testing-u-scan-shopper-smart-shopping-cart, Feb. 22, 2005.
IRISYS® Press Release, "Tesco 'One-in-Front' Campaign Wins Prestigious Retail Week Award Using IRISYS Queue Busting Camera Technology," Mar. 2, 2006.
Zebra Black & White Paper, "Service on the Spot: Mobile Queue Busting Systems for Improved Customer Loyalty and Sales," 2007.
PSC, "Magellan SL™ Scanner and Scanner Scale User's Guide," Oct. 1997.

\* cited by examiner

INFORMATION GATHERING AND DECODING APPARATUS AND METHOD OF USE

RELATED APPLICATIONS

This application claims priority under 35 U.S.C. §119(e) to U.S. Provisional Application No. 61/074,584 titled Information Gathering and Decoding Apparatus and Method of Use and filed on Jun. 20, 2008, and to U.S. Provisional Application No. 61/138,900 titled Information Gathering and Decoding Apparatus and Method of Use and filed on Dec. 18, 2008, which are both fully incorporated by reference herein.

BACKGROUND

The field of the present disclosure relates to information gathering and decoding methods and apparatuses for substantial parallel processing of customer orders such as at a retail checkout location.

Previously existing methods and systems for using multiple data capture devices, for example, for processing a customer's items order at a checkout station of a retail establishment, generally fall into one of two categories. One category is a fixed data capture device with a hand-held data capture device plugged into the fixed data capture device, either directly or through the hand-held data capture device's base station. Such arrangements are commonly employed with point of sale systems ("POS systems") where bulky items are frequently checked out. The fixed data capture device is used for smaller items because it permits the checkout clerk's hands to both be free, while the hand-held data capture device is used for bulky items so the checkout clerk does not need to lift bulky items onto a countertop. The hand-held data capture device essentially operates in place of the fixed data capture device when the hand-held data capture device is used, that is, either the fixed data capture device may be used, or the hand-held data capture device may be used, but not both simultaneously.

The second category is a hand-held data capture device that operates independently from a fixed data capture device. In such an arrangement, the fixed data capture device is used to process an order of a first customer while at the same time the hand-held data capture device is used to process an order of a second customer. The fixed data capture device typically interacts directly with a point of sale system, either communicating to a back room server or directly to a cash register. The hand-held data capture device operates independently of the fixed data capture device and may also communicate directly with the POS system, typically wirelessly with the back room server. The hand-held data capture device may also include a printer or removable memory that is used to print or store a customer's order. The print out or removable memory is then used to input the customer's order at either the fixed data capture device or the cash register. Such systems require software and hardware alterations to existing point of sale systems to be implemented.

The present inventors have recognized limitations and drawbacks associated with existing methods and systems for using multiple data capture devices. For example, some present methods and systems are not able to operate data capture devices simultaneously. To communicate with two data capture devices some methods and systems require modification of a POS system, such as cash registers or a back-room computer system or server connected to the cash registers, by making software modifications, hardware modifications, or both. The present inventors have also recognized the potential to improve upon present methods and systems for using multiple data capture devices.

SUMMARY

In exemplary embodiments described below, two information gathering devices are operable to be used substantially simultaneously to process one, or multiple, customer orders to help decrease the time customers wait in line for orders to be processed. For example, customer order information is sent from a second information gathering device to a first information gathering device via second and first communication devices. Preferably, only the first information gathering device communicates with a computer system, such as a POS system. A controller in the first information gathering device is preferably programmed to send information from both of the information gathering devices to the computer system as if the information originated only from the first information gathering device. The information from the second information gathering device may be sent to the computer system via the first communication device intermixed with the information from the first information gathering device, before the information from the first information gathering device is sent, or after the information from the first information gathering device is sent. Such programming in the first information gathering device preferably allows the two information gathering devices to be used with existing computer systems, such as a POS system, without modifying the computer system or the interface between the first information gathering device and the computer system.

An exemplary system includes a first information gathering device and a second information gathering device that communicate with one another, preferably wirelessly. The first information gathering device may be fixed, for example, mounted in a checkout counter, and includes a housing that contains a first data capture device and a controller, such as a microprocessor, signal processor, central processing unit, or other suitable device, that includes a memory operatively connected to the controller.

The second information gathering device is preferably a hand-held device. A second data capture device is operatively connected to a second controller in the second housing. The second information gathering device may include a power source that is contained in the second information gathering device.

Another exemplary system includes a first information gathering device and a second information gathering device that communicate with one another, and preferably receive input from an attendant. The first information gathering device may be fixed, for example, mounted in a self-checkout counter, and includes a housing that contains a first data capture device, a first controller operatively connected to the first data capture device, and a memory operatively connected to the first controller. The second information gathering device may also be fixed, for example, mounted in a kiosk, and includes a second data capture device.

Additional aspects and advantages will be apparent from the following detailed description of preferred embodiments, which proceeds with reference to the accompanying drawings.

DETAILED DESCRIPTION OF PREFERRED EMBODIMENTS

Preferred embodiments will now be described with reference to the drawings. While several preferred embodiments are described with reference to a fixed information gathering device and a handheld information gathering device, a practitioner in the art will realize from the description that the principles described are viable to other applications. The described embodiments, as well as other embodiments, have numerous applications where a pair, or more, of information gathering devices may be employed, and embodiments may be scaled and adapted to many applications.

The present inventors recognized a need for an information gathering and decoding method and apparatus that could process multiple customers' orders, or a single customer's order, substantially in parallel without making modifications to a retailer's POS system. When retailers have a POS system that is properly programmed and includes the retailer's inventory, retailers are extremely hesitant to make modifications to the POS system for fear of introducing errors. In a complex computing environment with large databases, such as a POS system, even a relatively minor software change or hardware change can cause bugs, memory leaks, or other errors that cause the system to malfunction. A malfunctioning point of sale system means lost revenue for a retailer, and is therefore earnestly avoided.

The present inventors recognized that processing a single customer's, or multiple customers', orders with multiple information gathering and decoding apparatuses could help retailers to reduce customer waiting time during peak demand periods. The present inventors also realized that retailers may benefit from using a relatively inexpensive information gathering apparatus in conjunction with a more expensive information gathering apparatus because the retailer would also have non-peak demand periods, that is, little or no customer lines, where the second information gathering apparatus would not be used.

The present inventors also recognized a need to expedite qualification for customers who use self-checkout stations and desire to purchase restricted items, such as tobacco products or alcoholic beverages.

Figure 1:
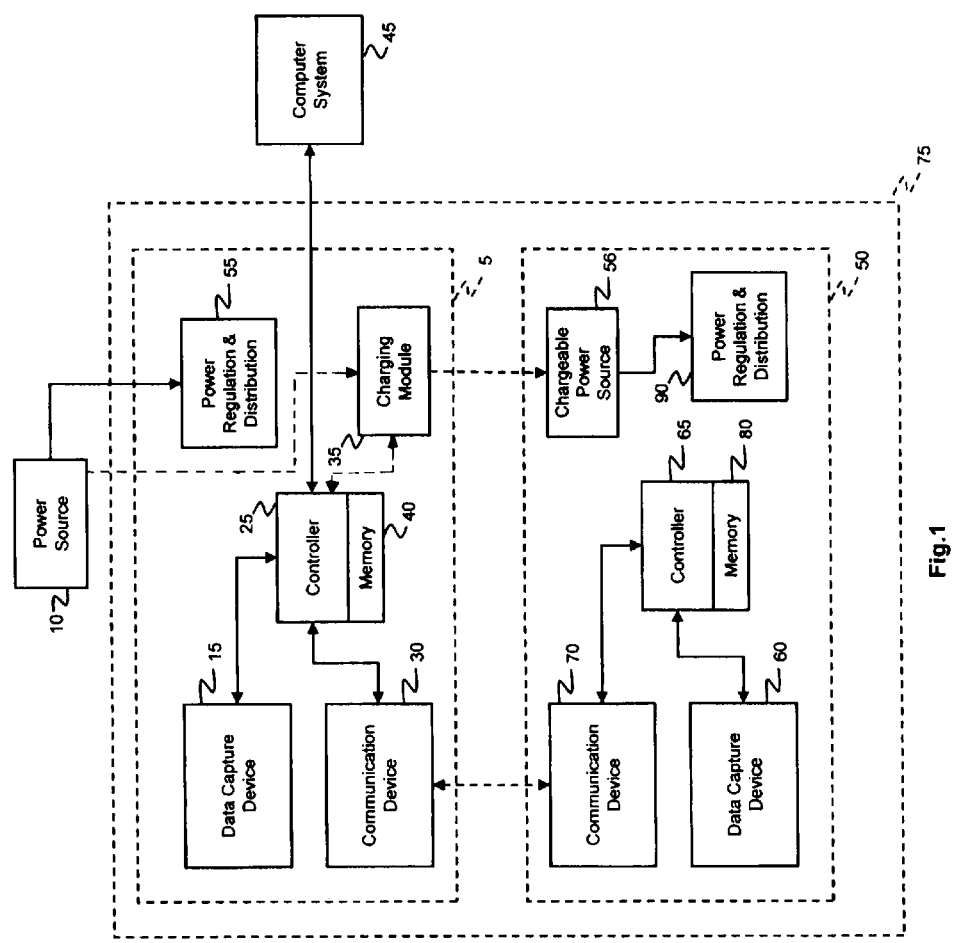
FIG. 1 is a schematic diagram of an information gathering and decoding apparatus according to one embodiment.

Referring now to the drawings, FIG. 1 is a schematic diagram of an information gathering and decoding apparatus 75. The information gathering and decoding apparatus 75 has a first information gathering device 5 and a second information gathering device 50. The first information gathering device 5 and the second information gathering device 50 may be a data reader such as a barcode scanner utilizing optical means to capture data, such as lasers or imaging cameras, or may be radio frequency readers (RFID), or any other suitable device used to capture information. Information gathering devices 5 and 50 may collect information in many manners. Therefore, references to scanning, reading, and gathering information should be understood to be inclusive of one another as well as inclusive of other manners for collecting information.

The first information gathering device 5 is powered by a power source 10, for example a wall outlet connected to a power grid, a battery, a fuel cell, or other source of electrical energy. The power source 10 may be external to the housing of the first information gathering device 5 or may be internal to the housing of the first information gathering device 5. The power source 10 connects to a power regulation and distribution system 55 which sends power to all the necessary internal devices (all connections not shown). In the housing of the first information gathering device 5 is a data capture device 15 that reads data, for example, barcodes or radio frequency transmissions. The data capture device 15 is operatively connected to a controller 25. The controller 25 may (1) have a memory incorporated as part of the controller, for example a random access memory, (2) be operatively connected to a memory 40, for example, but not limited to, a flash memory, a random access memory, or a hard drive, or (3) have both an incorporated memory and an operatively connected memory.

The controller 25 is operatively connected to a computer system 45, for example, a POS system. The controller 25 transmits information gathered by the data capture device 15 to the computer system 45, and may also transmit information gathered by a data capture device 60 in the information gathering device 50, information stored in memory 40, or information stored in memory 80, as discussed below. The controller 25 is also operatively connected to a communication device 30 for communicating with the second information gathering device 50. As discussed below, the first information gathering device 5 and the second information gathering device 50 may transmit data back and forth using their respective communication devices 30 and 70.

In some embodiments, the controller 25 is also operatively connected to a charging module 35, and the first power source 10 is operatively connected to the charging module 35. In some embodiments the charging module 35 is contained within information gathering device 5. The charging module 35 may include hardware, software, or both for charging a power source 56 for the second information gathering device 50, discussed below.

Preferably, the data capture device 15, controller 25, memory 40, communication device 30, and the charging module 35 (if included) are located in the housing of the first information gathering device 5. That is, the components are either surrounded by or on the housing (not depicted).

The second information gathering device 50 is powered by a power source 56 (such as a battery or other suitable power supply) that is preferably in the housing of the second information gathering device 50. The data capture device 60 reads data for the information gathering device 50, and is operatively connected to a controller 65. The controller 65 is operatively connected to a communication device 70 to send the read data from the controller 65 to the communication device 70.

The communication device 70 is configured to send data read by the data capture device 60 to the communication device 30. The communication device 30 is operatively connected to the controller 25 to send the data received from the communication device 70 to the controller 25. In the embodiment depicted in FIG. 1 the controller 25 is preferably programmed to process data read by both the information gathering device 5 and the information gathering device 50 in parallel, that is, at substantially the same time.

Communication devices 30 and 70 may be any suitable device, including, but not limited to, wireless transceivers such as BLUETOOTH® transceivers, infrared emitting and detecting equipment, and equipment that transmits information over cables such as fiber optic cables and metallic cables.

When the information gathering and decoding apparatus 75 is used, both of the information gathering devices 5 and 50 may be used at substantially the same time. Using both of the information gathering devices 5 and 50 at substantially the same time, or simultaneously, means that the information gathering devices 5 and 50 may be operated by two different individuals during the same time period and the data capture devices 15 and 60 may be activated at precisely the same moment in time. Further, the devices may be operated during overlapping moments in time, moments in time that are not overlapping, or any combination. The controller 25 is programmed to process the data gathered by the first information gathering device 5 and by the second information gathering device 50 regardless of when the data is transmitted to the controller 25. The data processing performed by the controller 25 is described in more detail below.

The controller 25 is also programmed to transmit data gathered by both the first information gathering device 5 and the second information gathering device 50 to the computer system 45 so that from the viewpoint of the computer system 45 all of the data appears to have originated from the first information gathering device 5. However, the signals generated by each of the first and second information gathering devices 5 and 50 may include identifying information for use by the first information gathering device 5 to ascertain which location (information gathering device 5 or information gathering device 50) originated the item read. One preferred method may comprise phantom ("special") codes or add-on code portions such as described in U.S. Pat. Appl. Pub. No. 2004/0113791, titled "Operation monitoring and enhanced host communications in systems employing electronic article surveillance and RFID tags," which is fully incorporated herein by reference.

An advantage of processing data from two separate information gathering devices 5 and 50 and transmitting the data to the computer system 45 as if the data originated from one information gathering device, the information gathering device 5 for example, is that there is no need to modify the computer system 45 to handle the input from the two separate information gathering devices 5 and 50. For example, a retailer could install two, or more, information gathering devices for a properly working POS system without modifying the POS system. Installing multiple information gathering devices may be done because the information from the multiple information gathering devices is presented to the POS system as if the information originated from one information gathering device, which current POS systems are built and programmed for.

One example of using the information gathering and decoding apparatus 75 to process customer purchases at a retail or grocery store is described with reference to FIG. 2. For example, in the process depicted in FIG. 2, a single customer has a very large order containing many items. At step 200 the information gathering device 50 is used by a pre-checkout clerk to gather data from the customer's items. For example, the information gathering device 50 may be used to read data from a product identification source such as a barcode, radio frequency identification tag, electronic article surveillance tag, or other suitable identification source. After gathering information from the items the pre-checkout clerk using the information gathering device 50 may bag the customer's items, or otherwise indicate that the items have been processed. At step 205, the information gathering device 5 is used by the checkout clerk to gather information from the same customer's items. After gathering information from the items the checkout clerk using the information gathering device 5 may bag the customer's items, or otherwise indicate that the items have been processed. For example, the pre-checkout clerk may scan all the bulky/large items leaving them in the cart. Thus, the checkout clerk completes the transaction by gathering information from all the smaller items placed on the counter and is informed that the large items remaining in the cart are already scanned. Alternately, steps 200 and 205 may be performed at substantially the same time by the two different persons.

While the information gathering devices 5 and 50 are being used, data gathered by the data capture device 60 in the information gathering device 50 at step 200 may be processed by the controller 65, sent to the communication device 70 and then transmitted to the communication device 30 at step 215. The communication device 30 sends the data to the controller 25. During the same time period, data gathered by the data capture device 15 in the information gathering device 5 at step 205 may be sent to the controller 25.

Controller 25 is programmed to process the data from the communication device 30 at step 220. For example, when the controller 25 receives a data transmission it may perform a database lookup to associate an item description, price, or other information with the data, may format the data into a format readable by the computer system 45, or both.

While the controller 25 is processing the data from the data capture device 15, it may also receive data from the communication device 30. In some embodiments, the data from the communication device 30 may be stored in random access memory while the controller finishes processing the data from the data capture device 15. When the controller 25 finishes processing the data from the data capture device 15 it transmits the processed data to the computer system 45 at step 225, then retrieves the data from the random access memory and processes that data at step 220. In other embodiments the controller 25 may contain a plurality of processors permitting the controller 25 to process data received from the data capture device 15 and from the communication device 30 at the same time.

Figure 2:
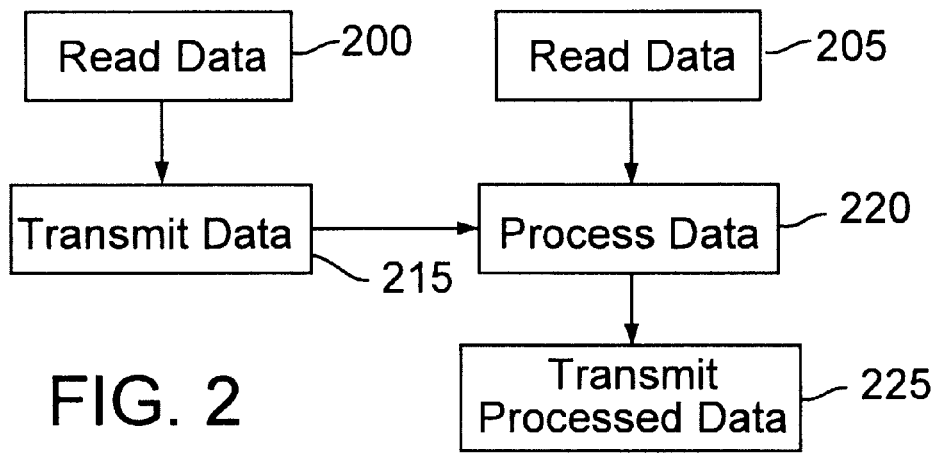
FIG. 2 is a schematic diagram of a process for using an information gathering and decoding apparatus.

The information gathering and decoding apparatus 75 operated according to the embodiment depicted in FIG. 2 thus allows a retail establishment to process a large customer order more quickly without modifying the retail establishment's POS system. The information gathering and decoding apparatus discussed with respect to FIG. 2 permits the two information gathering devices 5 and 50 to be used at substantially the same time and transmit data to the computer system 45 as if all of the data originated from the information gathering device 5.

Another example of using the information gathering and decoding apparatus 75 to process customer purchases at a retail or grocery store is also described with reference to FIG. 2A. For example, in the process depicted in FIG. 2A, two or more customers are in a single line for one checkout clerk. At step 200A the information gathering device 50 is used by a pre-checkout clerk to gather data from the second customer's items and the pre-checkout clerk indicates that the items have been processed as described above. Further, at step 200A, the pre-checkout clerk or the information gathering device 50 inserts information indicating the beginning, end, or both, of the second customer's items, such as a phantom code, for example.

At step 205A, the information gathering device 5 is used by the checkout clerk to gather information from the first customer's items. Steps 200A and 205A may be performed at substantially the same time by the two different persons.

While the information gathering devices 5 and 50 are being used, data gathered by the data capture device 60 in the information gathering device 50 at step 200A may be processed by the controller 65, sent to the communication device 70 and then transmitted to the communication device 30 at step 215A. The communication device 30 sends the data to the memory 40. Alternately, the data may be stored in a memory in the information gathering device 50 at step 215A.

During the same time period, data gathered by the data capture device 15 in the information gathering device 5 at step 205A is sent to the controller 25. Controller 25 is programmed to process the data from the data capture device 15 at step 220A. For example, when the controller 25 receives a data transmission it may perform a database lookup to associate an item description, price, or other information with the data, may format the data into a format readable by the computer system 45, or both.

While the controller 25 is processing the data from the data capture device 15, the pre-checkout clerk may repeat steps 200A and 215A for a third customer's items, including inserting information indicating the beginning, end, or both, of the third customer's items. When the controller 25 finishes processing the data from the data capture device 15, it transmits the processed data to the computer system 45 at step 225A, indicating the end of processing the first customer's items.

When the second customer approaches the checkout clerk, at step 205A the checkout clerk operates the first information gathering device 5 to gather information from the second customer's items, or if there are no remaining items to gather information from, to indicate to the controller 25 that a new order is being processed. At step 220A, the controller 25 retrieves the data associated with the second customer's items from the memory 40 and processes that data along with any data gathered at step 205A. When the controller 25 finishes processing the data, it transmits the processed data to the computer system 45 at step 225A, indicating the end of processing the second customer's items. Steps 200A through 225A may be repeated for any number of customers in the checkout clerk's line.

Figure 2A:
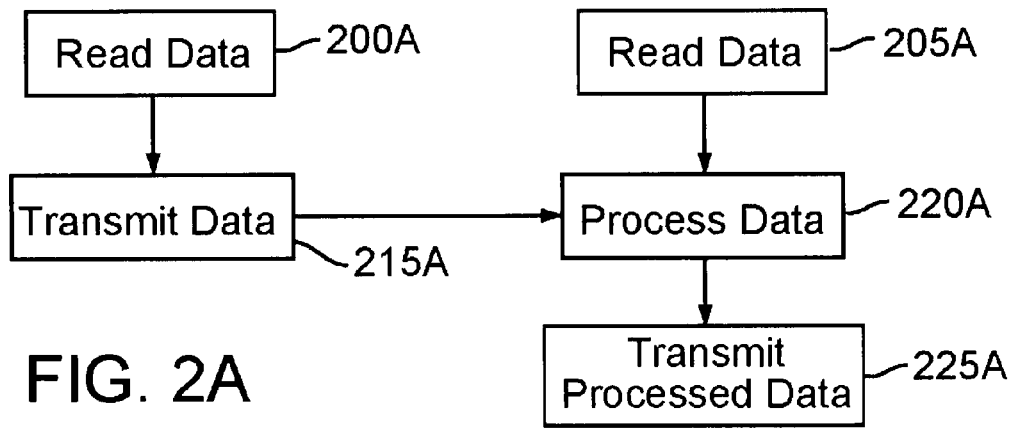
FIG. 2A is another schematic diagram of a process for using an information gathering and decoding apparatus.

The information gathering and decoding apparatus 75 operated according to the embodiment illustrated in FIG. 2A thus allows a retail establishment to process multiple customer orders more quickly without modifying the retail establishment's POS system by permitting the two information gathering devices 5 and 50 to be used at substantially the same time and transmit data to the computer system 45 as if all of the data originated from the information gathering device 5.

Figure 3:
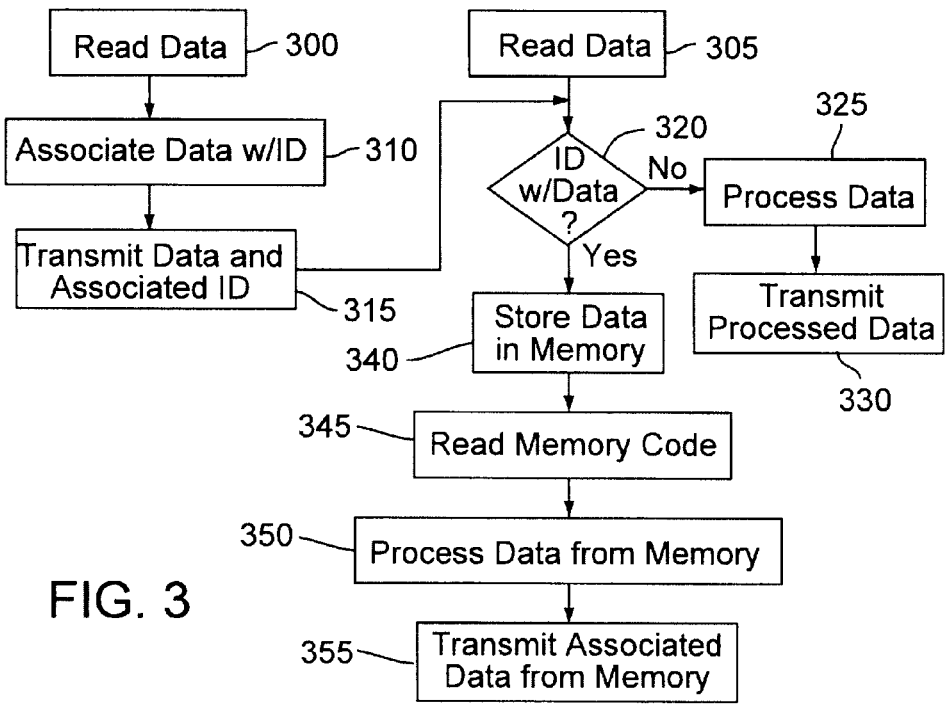
FIG. 3 is a schematic diagram of another process for using an information gathering and decoding apparatus.

Referring to FIG. 3, the information gathering and decoding apparatus 75 depicted in FIG. 1 may be used to process purchases of multiple customers at substantially the same time. During peak hours, a grocery store may have a large number of customers who want to check out at the same time, leading to long lines at the cash registers. When long lines form at the cash registers, the checkout clerk may use the information gathering device 5 to process the order of the customer who is first in line. While the checkout clerk uses the information gathering device 5, which may include a scale, to gather and process information about the first customer's items at the counter and transmit the processed information to the cash register (depicted as computer system 45 in FIG. 1), a pre-checkout clerk may use the information gathering device 50 to begin processing the second customer's items.

At step 305 the checkout clerk gathers information from the first customer's items using the information gathering device 5. At the same time, the pre-checkout clerk gathers information from the second customer's items using the information gathering device 50 at step 300. The pre-checkout clerk may begin gathering information from the second customer's items by first using the data capture device 60 to gather information about the second customer, for example, by obtaining a unique identifier associated with the second customer such as a customer rewards number or an identifier given to the second customer when the second customer steps in line.

The controller 65 may store the unique identifier, for example in a buffer or other memory, and associate the unique identifier with data from the second customer's items at step 310 as the pre-checkout clerk gathers information from the second customer's items using the data capture device 60. At step 315 the controller 65 sends data and the associated unique identifier to the communication device 70 which transmits data and the associated unique identifier to the communication device 30 in the information gathering device 5. In other embodiments, the controller 65 may store all of a customer's data in a buffer or other memory, then transmit all of the data and the associated identifier in a batch at step 315.

At step 320 the controller 25 receives data from both the data capture device 15 and from the communication device 30. In one embodiment, the data from the data capture device 15 does not have a unique identifier associated with it while the data from the communication device 30 does have a unique identifier associated with it. The controller 25 determines whether there is a unique identifier associated with the data it receives at step 320.

If the controller 25 determines there is not a unique identifier associated with an item data, the controller 25 processes the data at step 325, for example, as described above, then transmits the processed data to the cash register (depicted as computer system 45 in FIG. 1) at step 330 for completion of the first customer's order. If the controller 25 determines there is a unique identifier associated with the item data, the controller 25 stores the data and its unique identifier in the memory 40 at step 340. The controller 25 may process the data associated with a unique identifier as described above before storing the data and the unique identifier in the memory 40. The second customer's items are therefore stored in the memory 40 of the information gathering device 5 while the information gathering device 5 processes the items of the first customer.

When the first customer's order has been completely processed and the second customer is checking out, the first information gathering device 5 may read a memory code at step 345 that tells the controller 25 to finish processing the data stored in the memory 40 at step 350, transmit the processed data to the cash register at step 355, or both. The controller 25 may also be programmed to erase the memory 40 after reading the memory code and processing the data in the memory 40 or transmitting the data from the memory 40.

Without reading the memory code again, the checkout clerk operating the first information gathering device 5 may add items to the second customer's order, for example, items that need to be weighed or otherwise input through a system not available at the second information gathering device 50 at step 305. At substantially the same time, the pre-checkout clerk may begin gathering information from a third customer's order at step 300.

Figure 3A:
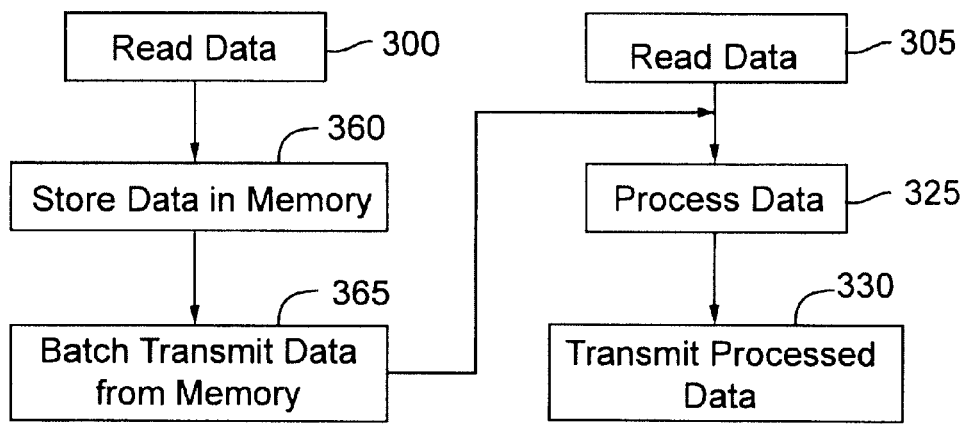
FIG. 3A is a schematic diagram of a modification to the process of FIG. 3 for using an information gathering and decoding apparatus.

In an alternate embodiment illustrated in FIG. 3A, the second information gathering device 50 may include a memory 80 that stores the second customer's items at step 360 after being gathered at step 300. Instead of transmitting the second customer's data and an associated identifier one-at-a-time at step 315, the second customer's data may be transmitted as a batch to the communication device 30 at step 365, and thus to the controller 25, for example, after completion of the first customer's order. After a batch data transmit at step 365, any further data read at step 305 may be added to the data from the batch data transfer until the cash register indicates that the order has been completely processed.

Figure 4:
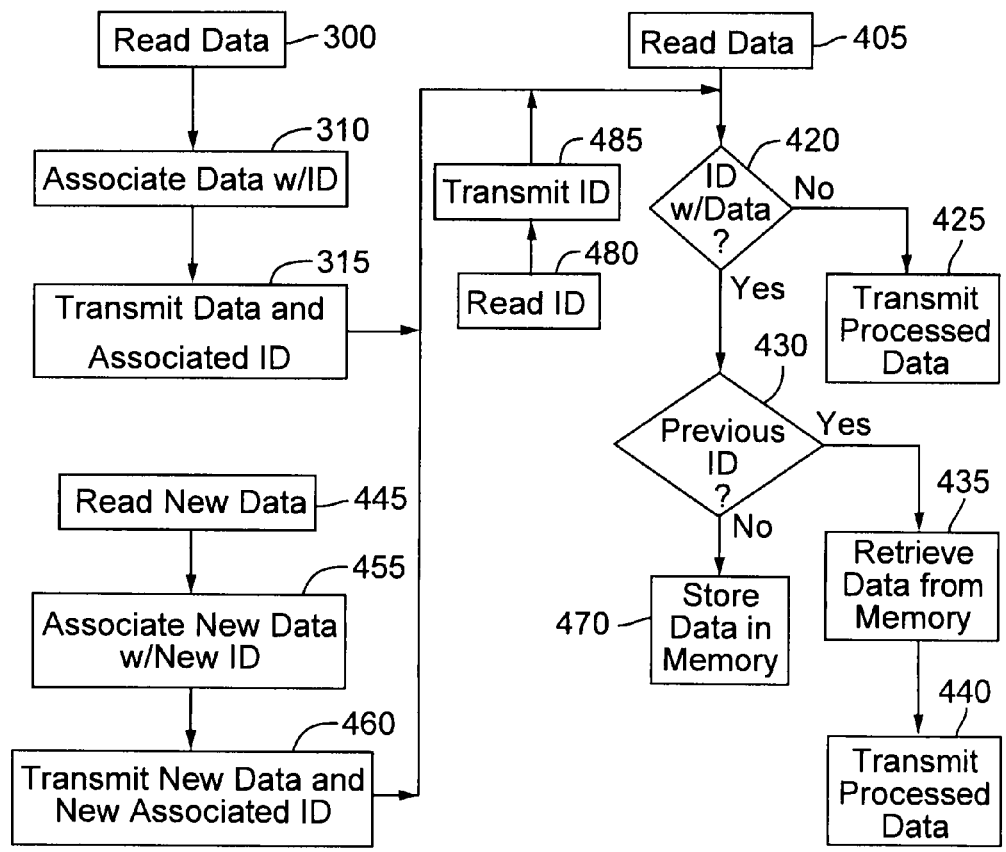
FIG. 4 is a schematic diagram of another process for using an information gathering and decoding apparatus.

FIG. 4 is a flow chart of another embodiment containing additional processing that may occur when the second customer reaches the checkout clerk. Note that the steps 300, 310, and 315 are included in FIG. 4 to illustrate that processing from FIG. 3 is included in the embodiment depicted in FIG. 4. When the second customer was the second person in line, and the checkout clerk processed the first customer's items, information about the second customer's items was gathered using the data capture device 60 at step 300 as described above. The controller 65 associated the data for the second customer's items with a unique identifier at step 310, and at step 315 the data and unique identifier were transmitted from the information gathering device 50 to the information gathering device 5, eventually resulting in the data and unique identifier being stored in memory 40 at step 340.

When the second customer reaches the checkout clerk, at step 480 the checkout clerk uses the data capture device 15 to gather the information about the second customer, for example the unique identifier associated with the second customer such as a customer rewards number or an identifier given to the second customer when the second customer stepped in line. The unique identifier for the second customer is sent to the controller 25 from the data capture device 15 at step 485. The controller 25 is programmed to recognize whether a unique identifier is present at step 420, and if a unique identifier is present the controller is programmed to determine whether the unique identifier has previously been used at step 430. For example, when a unique identifier is transmitted on its own, that is, there is no accompanying data, the controller 25 may determine that the unique identifier has been previously used at step 430 because there is no accompanying data.

When the controller 25 recognizes a previously used unique identifier at step 430, the controller 25 retrieves the data associated with that unique identifier from the memory 40 at step 435. For example, the controller 25 may send a query to a database residing on the memory 40 and pass the unique identifier as part of the query. The database on the memory 40 may return all of the records where a data is associated with that unique identifier.

At step 440 the controller 25 finishes processing the data for the second customer's items, and, if necessary, transmits the processed data to the cash register (depicted as computer system 45 in FIG. 1). The cash register processes the second customer's items as if all of the information concerning the second customer's items had been gathered using the information gathering device 5, even though the information was gathered using the information gathering device 50. The checkout clerk's time for processing the second customer's items is thus reduced because the items' information was previously gathered.

While the second customer is checking out at the cash register, the pre-checkout clerk may use the information gathering device 50 to begin gathering information from a third customer's items at step 445. Of course, depending on the number of items being purchased by the various customers, the timing of when the pre-checkout clerk is able to begin gathering information from a customer's items will vary. The pre-checkout clerk may begin gathering information from the third customer's items by first using the data capture device 60 to gather information about the third customer, for example by obtaining a new unique identifier associated with the third customer such as a customer rewards number or an identifier given to the third customer when the third customer stepped in line.

The controller 65 may discard the old unique identifier and remember the new unique identifier and associate the new unique identifier with each data from the third customer's items at step 455. At step 460 the controller 65 sends each new data and the associated new unique identifier to the communication device 70 which transmits each new data and the associated new unique identifier to the communication device 30 in the information gathering device 5.

If the controller 25 determines there is a unique identifier at step 420 and that it is a new unique identifier associated with data at step 430, the controller 25 stores the new data and its new unique identifier in the memory 40 at step 470. The controller 25 may process the new data associated with the new unique identifier as described above before storing the new data and the new unique identifier in the memory 40. The third customer's items are therefore stored in the memory 40 of the information gathering device 5 while the information gathering device 5 processes the items of the second customer.

Another embodiment is described still referring to FIG. 4. In this embodiment, the second customer may have items that cannot have information gathered by the pre-checkout clerk using the information gathering device 50. For example, the second customer may have items that need to be weighed in order to determine their value and the pre-checkout clerk may not have access to a scale.

At substantially the same time as the pre-checkout clerk gathers information from the third customer's items and the items are processed in steps 445, 455, 460, 420, 430, and 470 described above, the checkout clerk may process additional items for the second customer after obtaining the second customer's unique identifier at step 480 as described above. The controller 25 may be programmed to retrieve the second customer's items from the memory 40 as described above and then be ready to accept additional items through information gathering device 5.

At step 405 the checkout clerk may gather information from additional items using the data capture device 15, or additional items may be input through another system, for example, a scale operatively connected to, or incorporated into, the information gathering device 5, manually entered into the cash register, or a combination of these. At step 420, the controller 25 determines that the data resulting from step 405 does not have a unique identifier associated with it. The controller 25 processes the data as described above, then transmits the processed data to the cash register (depicted as computer system 45 in FIG. 1) at step 425. The checkout clerk is thus able to process items that were missed or could not have information gathered by the pre-checkout clerk when the second customer's items were read with the information gathering device 50, or items the second customer acquired after the pre-checkout clerk finished reading the second customer's items and moved on to the third customer.

Figure 4A:
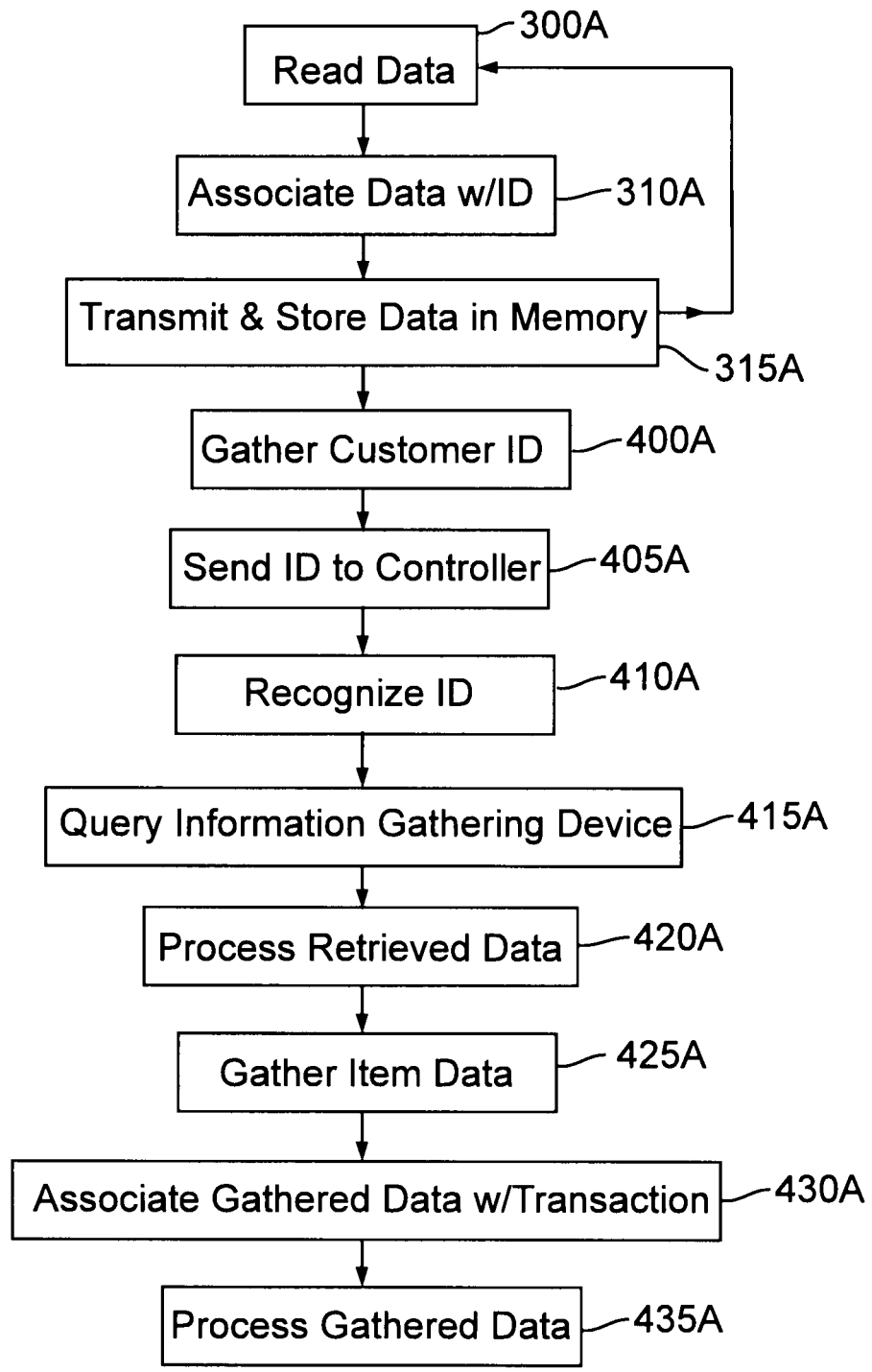
FIG. 4A is a schematic diagram of another process for using an information gathering and decoding apparatus.

FIG. 4A is a flowchart of an alternate processing method. Instead of storing item data for each customer at the first information gathering device 5, which is preferably associated with a particular checkout station, the method of FIG. 4A stores item data for each customer at the second information gathering device 50. Such an embodiment may be particularly useful for checkout setups where customers stand in a single queue and are checked out at one of several checkout stations. Since a customer, or a pre-checkout clerk, does not know the particular checkout station where the customer will check out, storing the item data for the customer in the second information gathering device 50 preferably permits the customer to go to any checkout station and present a unique identifier. A first information gathering device 5 at the checkout station queries the second information gathering device for item data information associated with the customer, as described below. While the following description refers to one first information gathering device 5 and one second information gathering device 50, multiple information gathering devices 5 and information gathering devices 50 may be used.

When a second customer was the second in line, and a checkout clerk processed the first customer's items, information about the second customer's items was gathered using the pre-checkout data capture device 60 at step 300A in a similar manner as described above. The controller 65 associated the data for the second customer's items with a unique identifier at step 310A, and at step 315A the data and unique identifier were transmitted to the controller 65 and stored in memory 80.

When the second customer reaches a checkout clerk, at step 400A the checkout clerk uses the data capture device 15 to gather information about the second customer, for example the unique identifier associated with the second customer such as a customer rewards number or an identifier given to the second customer when the second customer stepped in line. The unique identifier for the second customer is sent to the controller 25 from the data capture device 15 at step 405A. The controller 25 is programmed to recognize a unique identifier at step 410A, as opposed to determining that item data has been received. The controller is programmed to query a second information gathering device 50 using the communication devices 30 and 70 by passing the unique identifier to the controller 65 at step 415A. For example, the controller 25 sends a query to a database residing on the memory 80 and passes the unique identifier as part of the query. The database on the memory 80 returns all of the records where a data is associated with that unique identifier.

At step 420A the controller 25 finishes processing the data retrieved from the memory 80 for the second customer's items, and, if necessary, transmits the processed data to the cash register (depicted as computer system 45 in FIG. 1). Optionally, if the second customer has items that did not have information gathered by the pre-checkout clerk using the information gathering device 50, the checkout clerk uses the information gathering device 5 to gather information from such items at step 425A. For example, the second customer may have items that need to be weighed in order to determine their value and the pre-checkout clerk may not have access to a scale. At step 425A the checkout clerk may gather information from additional items using the data capture device 15, or additional items may be input through another system, for example, a scale operatively connected to, or incorporated into, the information gathering device 5, manually entered into the cash register, or a combination of these. At step 430A, the controller 25 determines that the data gathered during step 425A is part of the transaction associated with the second customer's unique identifier, for example, because the checkout clerk has not ended the transaction. At step 435A the controller 25 processes the data gathered at step 425A as described above, then transmits the processed data to the cash register (depicted as computer system 45 in FIG. 1). The checkout clerk is thus able to process items that were missed or could not have information gathered by the pre-checkout clerk when the second customer's items were read with the information gathering device 50, or items the second customer acquired after the pre-checkout clerk finished reading the second customer's items and moved on to the third customer.

The cash register processes the second customer's items as if all of the information concerning the second customer's items had been gathered using the information gathering device 5, even though some or all of the information was gathered using the information gathering device 50. The checkout clerk's time for processing the second customer's items is thus reduced because the items' information was previously gathered.

While the second customer is checking out at the cash register, the pre-checkout clerk may use the information gathering device 50 to begin gathering and storing information from a third customer's items (steps 300A-315A), and steps 400A-435A are repeated when the third customer reaches a checkout station. Of course, depending on the number of items being purchased by the various customers, the timing of when the pre-checkout clerk is able to begin gathering information from a customer's items will vary.

The previous embodiments, as well as subsequent embodiments, for operating an information gathering and decoding apparatus may be implemented using the same equipment depending on hardware configurations, software configurations, or both. For example, a switch may be provided on the second information gathering device 50, or on the first information gathering device 5, that permits the second information gathering device 50 to be operated in different modes, including, but not limited to, the method described with respect to FIG. 2 and the methods described with respect to FIGS. 2A through 4A. While the methods described with respect to FIGS. 2A through 4A reference a checkout clerk, a self-checkout station may be used instead.

Figure 5:
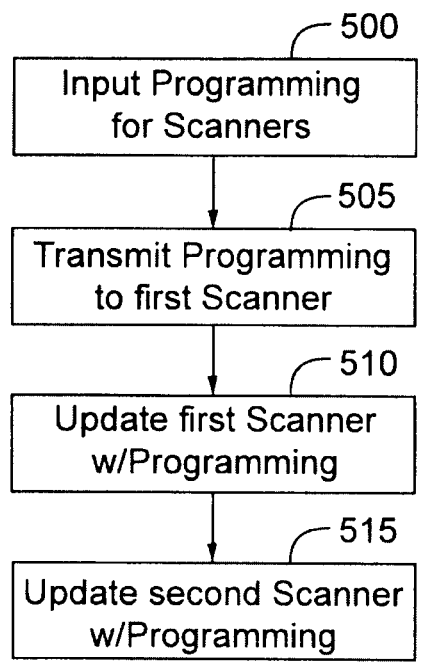
FIG. 5 is a schematic diagram of another process for using an information gathering and decoding apparatus.

FIG. 5 is a flowchart for a method for updating the first information gathering device 5 and the second information gathering device 50. Programming to update the first information gathering device 5 and the second information gathering device 50 may be input into computer system 45 at step 500, for example by keying in the programming, or loading the programming from a network medium such as the Internet, an optical disc, or magnetic storage medium. The programming for the first information gathering device 5 may be identical to the programming for the second information gathering device 50, or the programming for the second information gathering device 50 may be different from the programming for the first information gathering device 5.

Because the first information gathering device 5 includes a controller 25 and a communication device 30, it is not necessary for the computer system 45 to directly update the second information gathering device 50 with new programming. Instead, the computer system 45 may transmit programming for both the first information gathering device 5 and the second information gathering device 50 to the first information gathering device 5 at step 505. The controller 25 is programmed to update the first information gathering device 5 with the programming relevant to the first information gathering device 5 at step 510. At step 515, the controller 25 in the first information gathering device 5 is programmed to update the second information gathering device 50 through the communication devices 30 and 70.

Figure 6:
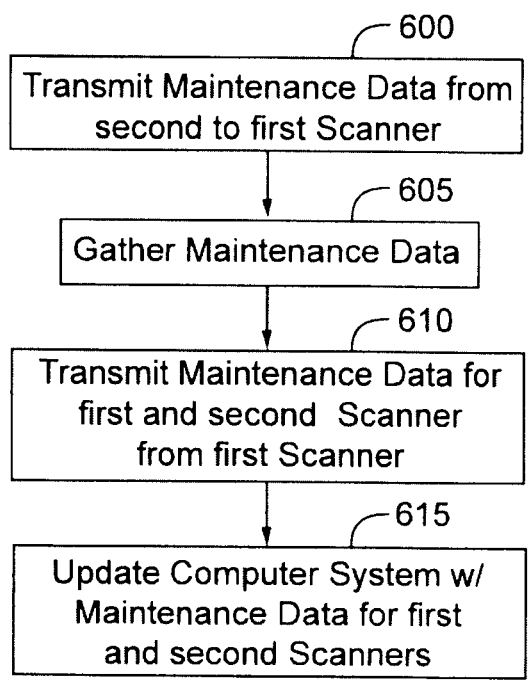
FIG. 6 is a schematic diagram of another process for using an information gathering and decoding apparatus.

FIG. 6 is a flowchart for a method for the first and second information transmitting devices 5 and 50 sending maintenance data to the computer system 45 via the first information gathering device 5. Maintenance data may include, for example, but is not limited to, information regarding how many cycles the data capture devices 15 and 60 have gone through, battery information for the power source 56 for the second information gathering device 50, and other information pertaining to the usage and maintenance of the first information gathering device 5 and the second information gathering device 50. At step 600 the second information gathering device 50 transmits maintenance data through the communication device 70 to the communication device 30 on the first information gathering device 5. At step 605, the controller 25 on the first information gathering device 5 gathers the maintenance data for both the first information gathering device 5 and the second information gathering device 50. The controller 25 transmits the maintenance data for both the first information gathering device 5 and the second information gathering device 50 to the computer system 45 at step 610. At step 615, the computer system 45 is updated with maintenance data pertaining to both the first information gathering device 5 and the second information gathering device 50.

Figure 7:
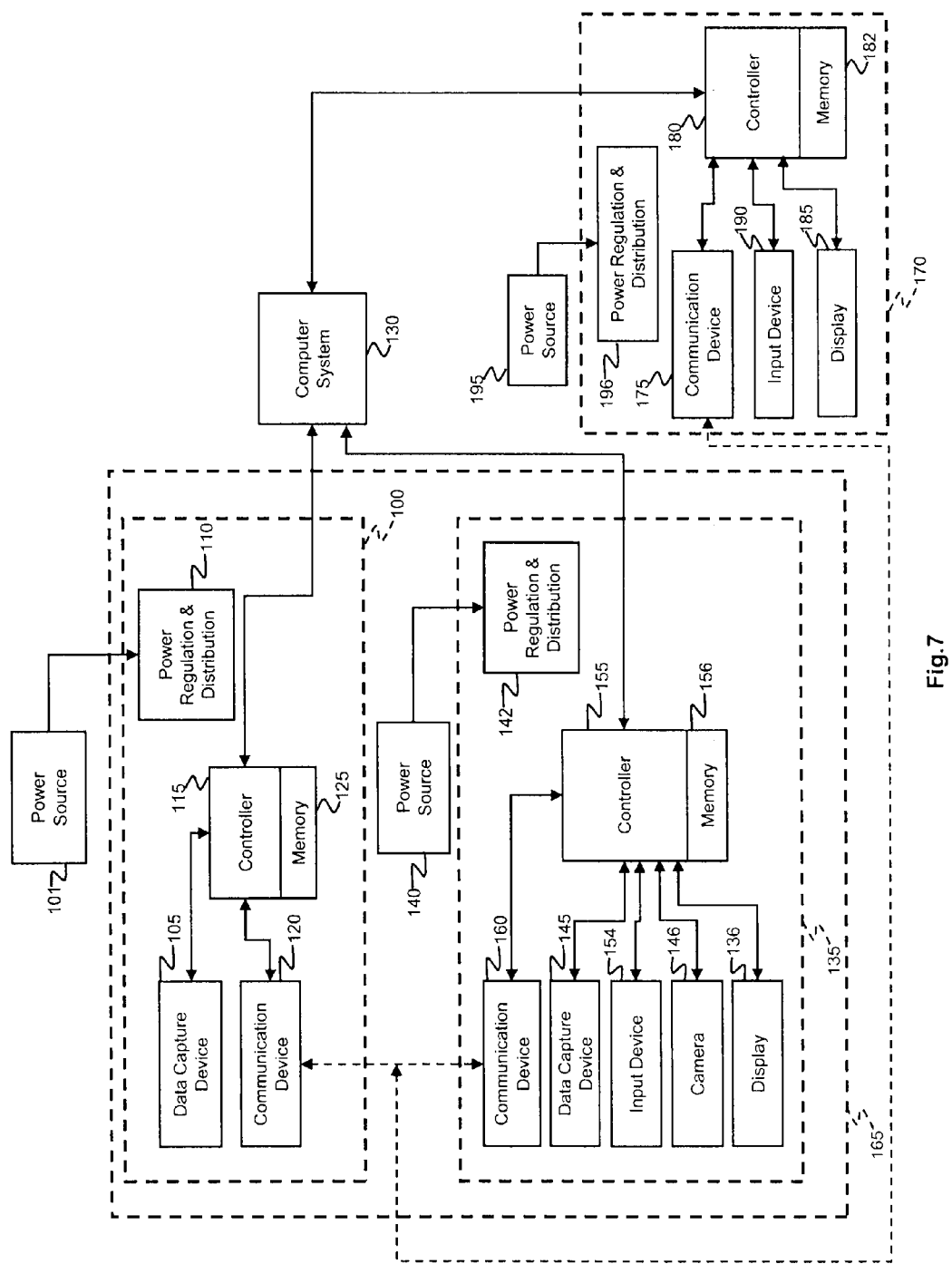
FIG. 7 is a schematic diagram of an information gathering and decoding apparatus according to a second embodiment.

FIG. 7 is a schematic diagram of an information gathering and decoding apparatus 165. The information gathering and decoding apparatus 165 has a first information gathering device 135 and a second information gathering device 100. The first information gathering device 135 and the second information gathering device 100 may be data capture devices utilizing optical means to capture data, such as lasers or imaging cameras, radio frequency (RFID) readers; or any other suitable device used to capture information, singularly or in any combination. Information gathering devices 100 and 135 may collect information in many manners. Therefore, references to scanning, reading, and gathering information should be understood to be inclusive of one another as well as inclusive of other manners for collecting information.

Both information gathering devices 100 and 135 are operatively connected to one another and to computer system 130, which is preferably a central POS server. An attendant station 170 is preferably operatively connected to the POS server 130, and may also be directly operatively connected with the information gathering devices 100 and 135, or indirectly connected through the POS server 130. In one embodiment, information gathering device 100 may be a self-checkout system, and information gathering device 135 may be a prequalification identification station. For simplicity, a system including one self-checkout system 100 and one information gathering device 135 is described. However, in a typical retail store application, a plurality of information gathering devices 100 and 135 are preferably connected to the computer system 130.

Any of the information gathering devices 100 and 135 may be used at substantially the same time. Using any of the information gathering devices 100 and 135 at substantially the same time, or simultaneously, may enable the information gathering devices 100 and 135 to be operated by different individuals during the same time period and the data capture devices 105 and 145 may be activated at precisely the same moment in time, overlapping moments in time, moments in time that are not overlapping, or any combination.

Transaction information for the checkout process may be stored in the store's main POS server 130, which may exchange data with the self-checkout system 100, other data stations such as the prequalification stations 135, or the attendant station 170, singularly or in any combination. When a customer presents identification or other information, such as qualifying information used to qualify whether a restricted item may be purchased, at the prequalification station 135, data captured from the identification or other information (1) may be associated and stored on the main POS server 130, (2) may be stored locally in the self-checkout system memory 125, or (3) may be stored on both. The captured data may also be stored in the local memory 182 of the attendant station 170. Captured data may be associated with the customer, for example, by linking the captured data to the customer's loyalty card number or to the customer's facial image in a database, or by other suitable manner. Captured data may also be processed to determine whether the customer may purchase restricted items.

Figure 8:
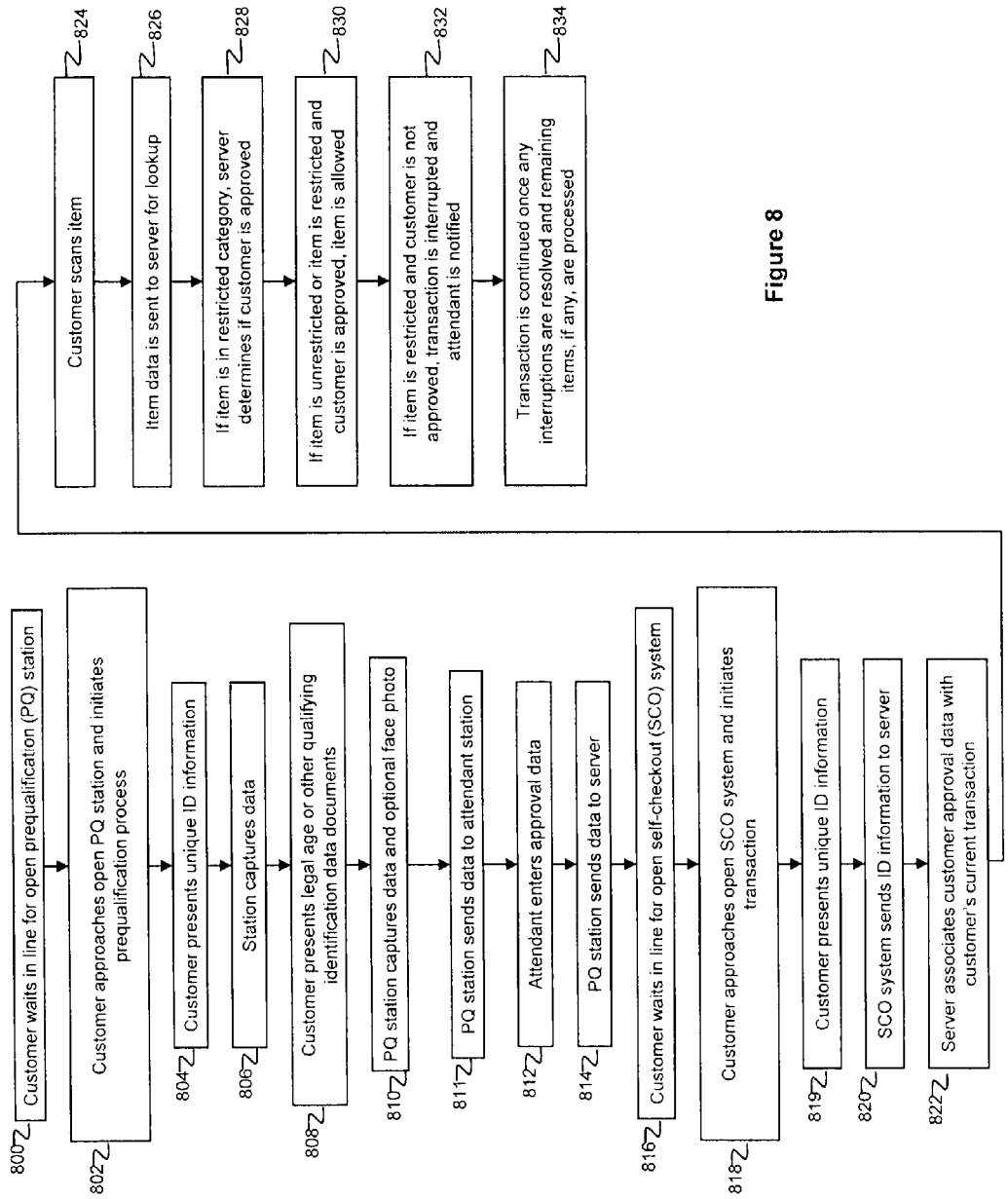
FIG. 8 is a schematic diagram of another process for using an information gathering and decoding apparatus.
Figure 9:
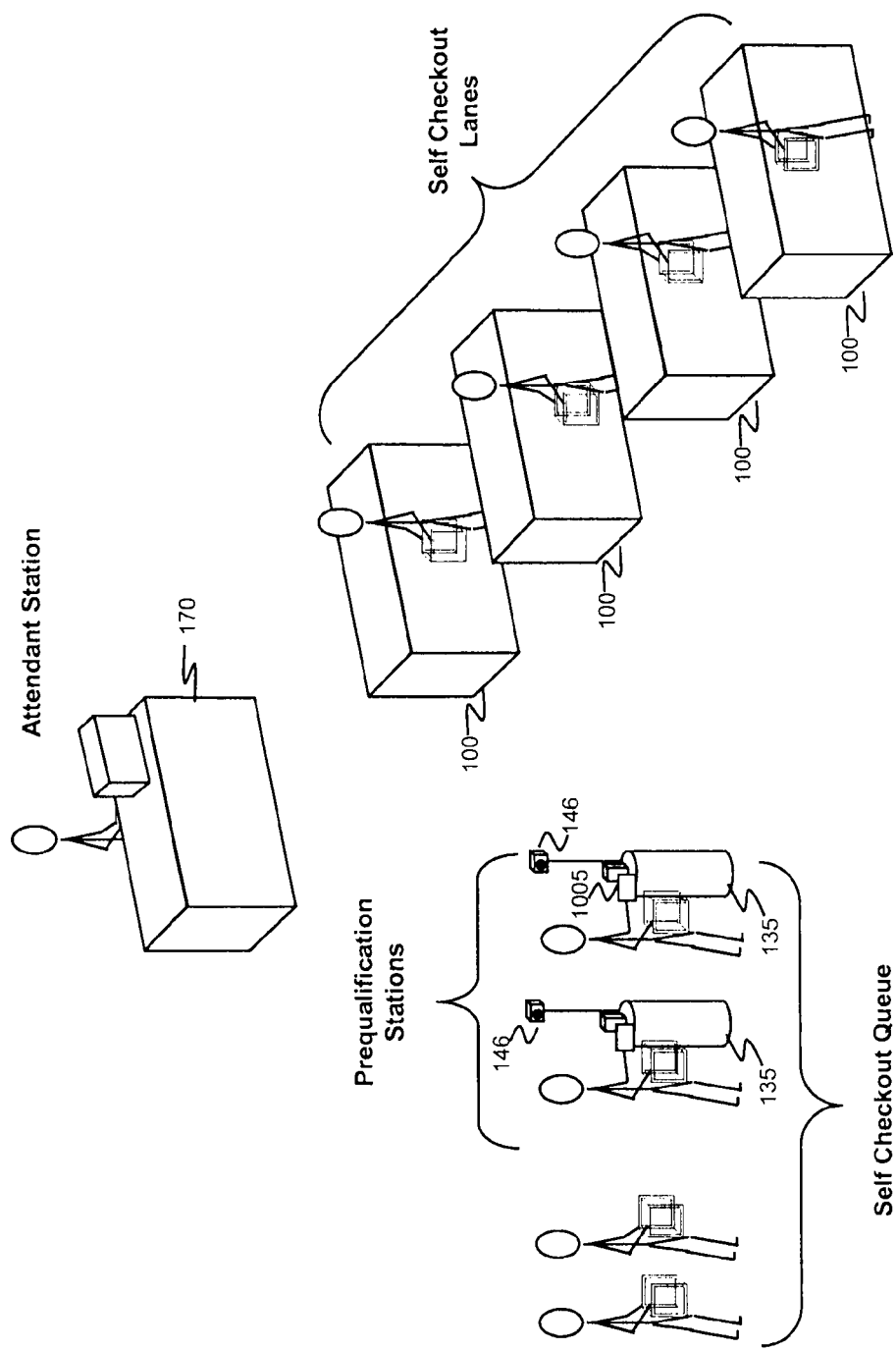
FIG. 9 is a schematic diagram of an information gathering and decoding apparatus used for pre-qualifying customers to purchase restricted items.

A preferred arrangement for an information gathering and decoding system is depicted in FIG. 9. A preferred process for operating a system as depicted in FIG. 9 is shown in FIG. 8. The process illustrated in FIG. 8 may be used with alternate information and decoding systems, such as the one depicted in FIG. 10. In the processing and system embodiments illustrated in FIGS. 8 and 9, the customer approval data, item lookup, and restriction checking functionalities reside in the main POS server 130.

When a customer waiting in line at step 800 finds an open prequalification station 135, the customer begins a prequalification session at step 802, for example, by pressing a button or activating a motion sensor. At step 804, the customer presents identifying information, such as a unique customer identifier such as a store's customer loyalty card, a pre-assigned identification number, the customer's face, or other suitable identifier, to the data capture device 145 in the prequalification station 135. The customer may also enter identifying information manually through an input device 154 such as a keyboard, touch screen, mouse, or other suitable device, or in another suitable manner, at step 804.

When the customer presents identifying information to the prequalification station 135, the prequalification station 135 captures data related to the identifying information at step 806. The customer may then present an identification containing qualifying data, for example, data that verifies the customer's age, at step 808. For example, the customer presents unique identification at step 808, such as a driver's license or passport; and an image of the customer's visage may also be captured by a camera 146 for record keeping or for use in a face recognition system.

The prequalification station 135 preferably captures the qualifying information, such as age verification data, captures a facial image, or both, at step 810. The prequalification station 135 associates the identifying information with the qualifying information and transmits the captured information to the attendant station 170 at step 811. At step 812, an attendant at the attendant station 170 enters approval or rejection information, based on one or more of the transmitted identifying information, qualifying information, facial image, or other criteria such as perceived customer age. For example, approval information may approve purchasing tobacco products, but not alcoholic beverages based on the customer's qualifying information.

One or more of the captured and associated identifying information, qualifying information, facial image, or approval or rejection information is sent to the central POS server 130 at step 814. Preferably the attendant station 170 transmits one or more of the captured identifying information, qualifying information, facial image, or approval or rejection information to the POS server 130. Alternately, the information may be routed to the POS server 130 through the prequalification station 135. The POS server 130 preferably links the captured data to the approval or disapproval information for use during an upcoming check-out transaction.

Alternatively, the captured identifying and qualification information may be associated with one another and transmitted to the POS server 130 by the prequalification station 135 without being transmitted to the attendant station 170. By this alternate method, when the customer scans a restricted item at a self-checkout station 100, as described below, the associated identifying and qualifying information may be used by the POS server 130 to determine whether the restricted item may be purchased, or the associated identifying and qualifying information may be transmitted to the attendant station 170 and used to determine whether the restricted item may be purchased, for example, as described above.

After using the prequalification station 135, the customer may wait until a self-checkout station 100 is available at step 816. To begin a self-checkout transaction, the customer preferably presents the same identifying information, such as a customer loyalty card, a PIN number, or the customer's face to the self-checkout system 100 at steps 818 and 819. The identifying information presented to the self-checkout station 100 does not need to be the same identifying information presented to the prequalification station 135. The self-checkout system 100 preferably captures the identifying information at step 820 and sends the identifying information to the central POS server 130.

At step 822, the POS server 130 associates one or more of the identifying information, qualifying information, facial image, or approval or rejection information transmitted to the POS server 130 at step 814 with the ongoing transaction data resulting from the customer's transaction initiation at step 818. For example, the POS server 130 may match the identifying information transmitted at step 820 with the identifying information transmitted at step 814 to retrieve the approval or rejection information, the qualifying information, or both.

During the purchasing transaction, the customer scans items using the self-checkout station 100 at step 824. Data from a scanned item is sent from the self-checkout station 100 to the POS server 130 at step 826, and the POS server 130 performs lookups to the store's price lookup ("PLU") database for each item scanned. Restriction flags associated with controlled items may be stored in the store's PLU database. If a particular item scanned at the checkout lane is associated with a restriction flag in the PLU database indicating an age limitation for purchasing the scanned item, the POS server 130 may compare the approval or rejection information, the qualifying information, or both, against the restriction requirements at step 828. Alternately, the POS server 130 may compare the associated identifying and qualifying information for the customer that was transmitted by the prequalification station 135 against the restriction information to determine whether the restricted item may be purchased. Alternatively, the POS 130 may send associated identification and prequalification information along with the restricted item information to the attendant station 170 where a purchasing decision may be made by the attendant station 170, an attendant at the attendant station 170, or both.

If a determination that the customer may purchase the restricted item is made after the PLU lookup, the POS server 130 preferably permits the transaction to continue by sending back the normal price and description data to the self-checkout system 100 at step 830. Otherwise, the POS server 130 may send a message or code to the self-checkout system 100 at step 832 indicating to the customer and to the attendant that the issue must be resolved by the attendant's action. If a message or code is transmitted at step 832, normal self-checkout processing continues at step 834 once the attendant and the customer resolve the issue regarding whether the customer may purchase the restricted item.

Figure 10:
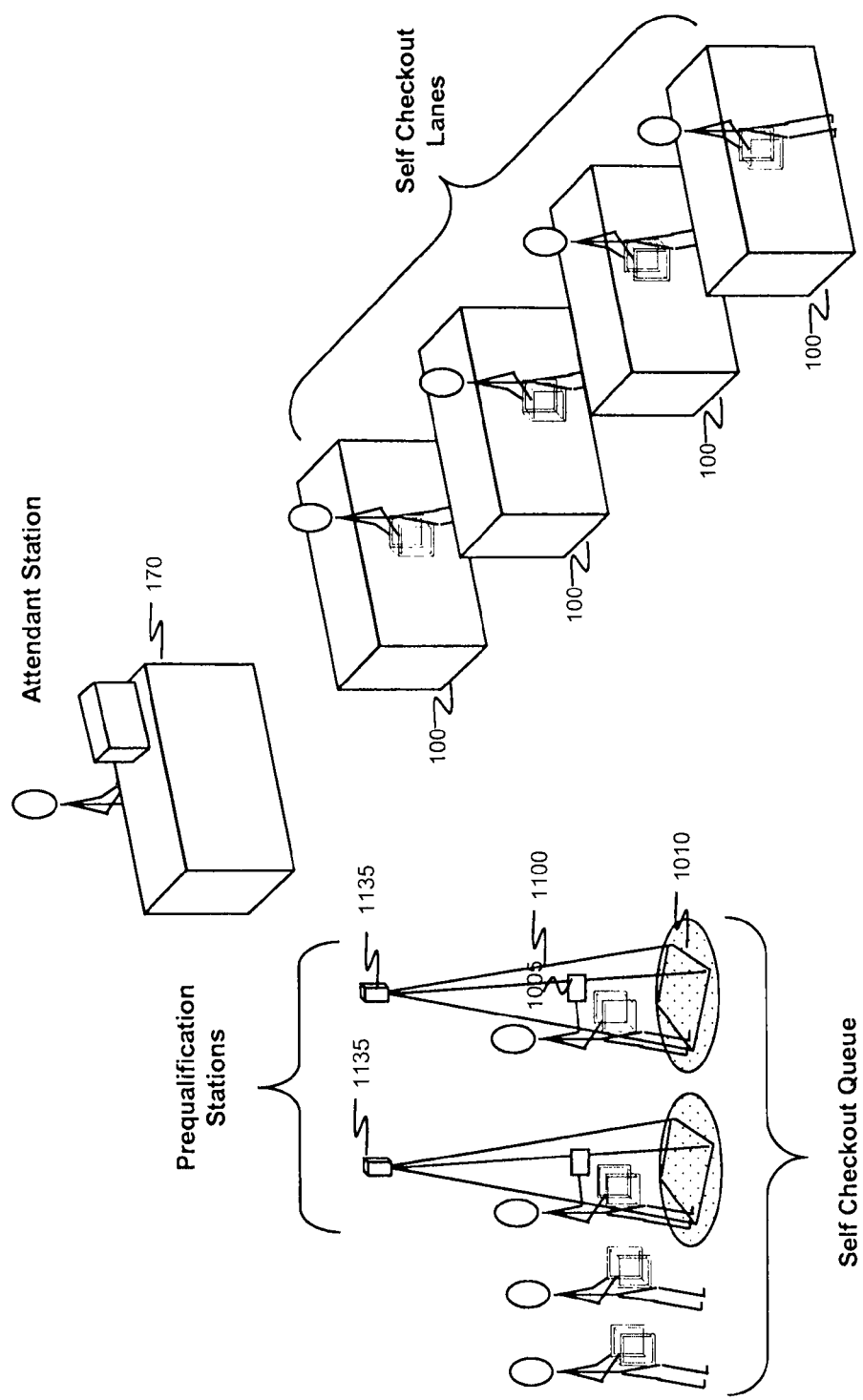
FIG. 10 is a schematic diagram of another information gathering and decoding apparatus used for pre-qualifying customers to purchase restricted items.

FIG. 10 is a schematic illustration of an alternate arrangement for pre-qualification stations 1135 is illustrated. The pre-qualification station 1135 in FIG. 10 may be contained in a location that is remote from where customers stand in line waiting for a self-checkout station 100 to become available. For example, the pre-qualification station 1135 may be located in the ceiling above the customer line. The display 136 may include light emitting diodes, laser diodes, or other light sources that provide information to a customer. For example, light beams 1100 may highlight a section of floor indicating that a customer should stand on that section of floor or present an identification 1005 over that section of floor if the customer desires to purchase a restricted item. Alternately, the floor itself may bear markings 1010 indicating where to stand or where to present an identification 1005. Once the customer stands or presents an identification 1005 where indicated, the data capture device 145 may capture information from the customer, the identification 1005, or both. An arrow, flashing light, or other suitable indicator may be used to direct the customer to look in a particular direction so an image of the customer's face may be captured by the data capture device 145, the camera 146, or both.

Once the pre-qualification station 1135 receives approval codes, rejection codes, or both, from the attendant, the attendant station 170, or both, the pre-qualification station 1135 may indicate to the customer whether restricted item purchases are approved or rejected. For example, the pre-qualification station 1135 may light or flash a colored light (such as green for approved and red for rejected), or provide other suitable indicia to the customer.

Figure 11:
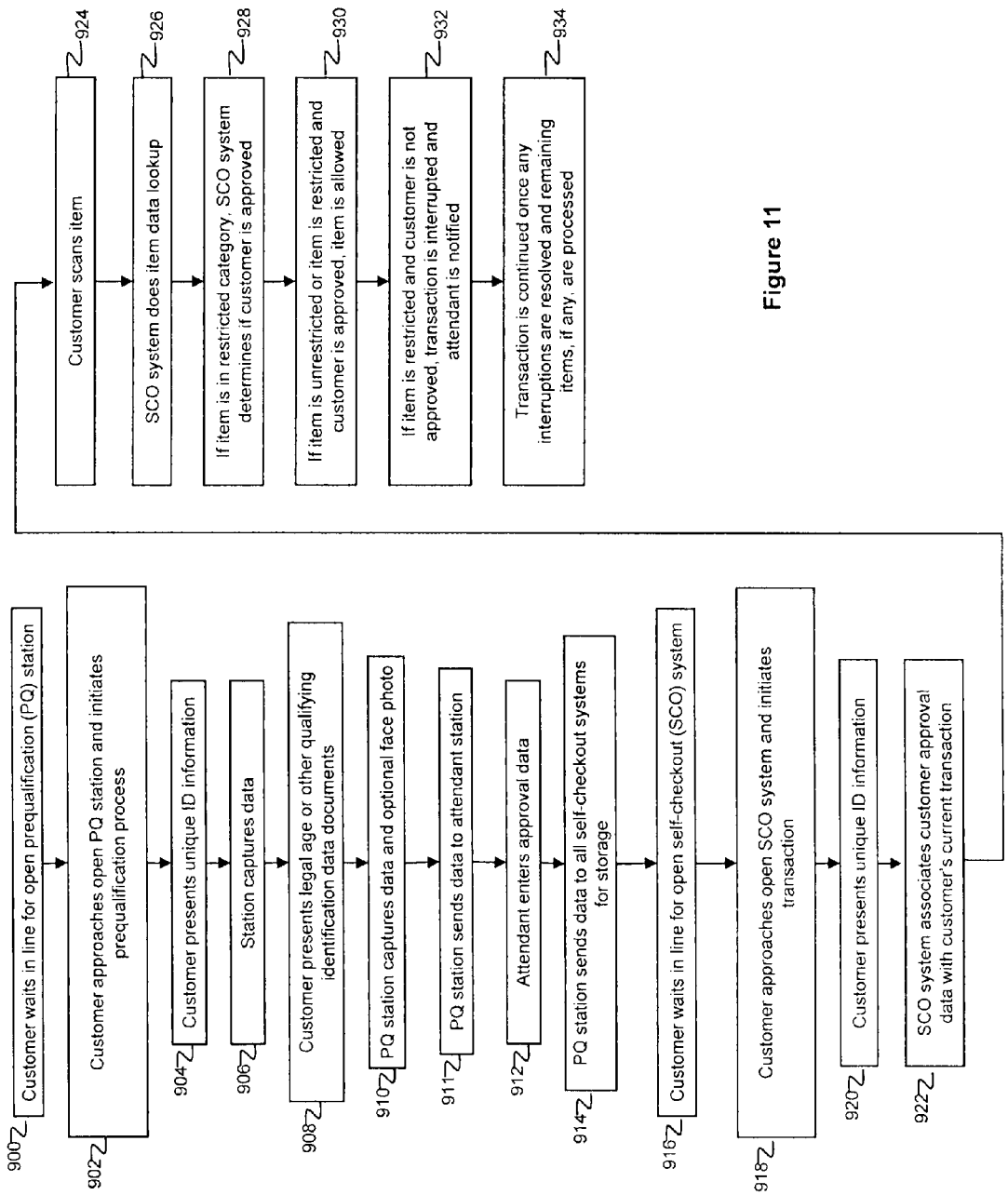
FIG. 11 is a schematic diagram of another process for using an information-gathering and decoding apparatus.

FIG. 11 is a flowchart of an alternate method for processing using the pre-qualification stations depicted in FIG. 10. The process illustrated in FIG. 11 is not limited to use on the system depicted in FIG. 10, but may be used on other suitable systems, such as the system depicted in FIG. 9, for example. In the process of FIG. 11, the customer approval data, item lookup, and restriction checking functionalities reside in the self-checkout systems 100. When a customer waiting in line at step 900 finds an open prequalification station 1135, the customer may begin a prequalification session at step 902, for example, by standing in a pre-designated spot. At step 904, the customer presents identifying information, such as the particular store's customer loyalty card, the customer's face, a PIN, or other suitable identifying information, to the data capture device 145 in the prequalification station 1135. The customer may also enter identifying information manually through an input device 154, or in another suitable manner, at step 904.

When the customer presents identifying information to the prequalification station 1135, the prequalification station 1135 captures data from the identifying information at step 906. The customer may then present an identification containing qualifying information, such as data that verifies the customer's age, at step 908. For example, the customer presents unique identification at step 908, such as a driver's license or passport; and an image of the customer's visage may also be captured by a camera 146 for record keeping or for use in a face recognition system.

The prequalification station 1135 preferably captures the qualifying information, captures a facial image, or both, at step 910. The prequalification station 1135 preferably associates the customer's identifying information with the customer's qualifying information, for example, through a database record, pointer, or link. The prequalification station 1135 transmits one or more of the captured identifying information, qualifying information, or facial image to the attendant station 170 at step 911. In some embodiments, at step 912, an attendant at the attendant station 170 enters approval or rejection information, based on one or more of the transmitted and associated identifying information and qualifying information, facial image, or a criterion such as perceived customer age. Alternatively, software, hardware, or both, on the attendant station 170 may generate approval or rejection information based on one or more of the transmitted and associated identifying information and qualifying information, facial image, or a criterion such as perceived age.

One or more of the captured unique identification, age verification data, facial image, or approval or rejection information is sent to the self-checkout stations 100 at step 914. In other processing embodiments, the prequalification station 1135 may transmit the associated identifying information and qualifying information, facial image, or both, directly to the self-checkout stations 100 without first sending the information to the attendant station 170, for example, when the identifying information and qualifying information, facial image, or both, are processed by software, hardware, or both, residing on the self-checkout stations 100 to generate approval or rejection information. Alternately, the prequalification station 1135 may store associated identifying information and qualifying information, facial image, or both, and transmit such information to a particular self-checkout station 100 when the self-checkout station 100 requests such information in response to receiving the unique identification.

Preferably, the attendant station 170 transmits one or more of the captured identifying information, qualifying information, facial image, or approval or rejection information directly to the self-checkout stations 100, but the information may be routed through the prequalification station 1135. Each self-checkout station 100 preferably stores the captured data and links the captured data to the attendant's approval or disapproval information for use during an upcoming check-out transaction.

After using the prequalification station 1135, the customer may wait until a self-checkout station 100 is available at step 916. To begin a self-checkout transaction, the customer preferably presents some identifying data, such as a customer loyalty card, a PIN number, or the customer's face to the self-checkout system 100 at steps 918 and 920. The self-checkout system 100 preferably captures identifying data at step 922 and matches the identifying data with the stored identifying information to retrieve one or more of the qualifying information, facial image, or approval or rejection information. Alternately, the self-checkout station 100 may use the captured data to query prequalification stations 1135 to retrieve one or more of the qualifying information, facial image, or approval or rejection information.

During the purchasing transaction, the customer scans items using the self-checkout station 100 at step 924. Data from a scanned item is used by the self-checkout station 100 to perform lookups in a locally stored copy of the merchant's price lookup ("PLU") database for each item scanned at step 926. Restriction flags associated with controlled items may also be stored locally on each self-checkout system 100. If a particular item scanned at the checkout lane is associated with a restriction flag in the PLU database indicating an age limitation for purchasing the scanned item, the self-checkout station 100 may compare retrieved approval/rejection information against the restriction requirements at step 928. Alternately, if the associated identifying and qualifying information was not sent to the attendant station 170 for generating approval/disapproval information, the self-checkout station 100 may base a purchase/no purchase decision on a comparison of the identifying information and qualifying information against the restricted item information associated with the item scanned at the self-checkout station 100. In other alternate processing embodiments, one or more of the identifying information, qualifying information, restricted item information, or facial image may be transmitted to the attendant station 170 by the self-checkout station 100 for a purchase approval/disapproval determination by the attendant station 170, an attendant at the attendant station 170, or both.

If the self-checkout station 100 determines that the customer may purchase the restricted item, the self-checkout station 100 preferably permits the transaction to continue at step 930. Otherwise, at step 932, the self-checkout station 100 may send a message or code to the attendant station 170 that the issue must be resolved by the attendant's action. If a message or code is transmitted at step 932, normal self-checkout processing continues at step 934 once the attendant and the customer resolve the issue regarding whether the customer may purchase the restricted item.

Figure 12:
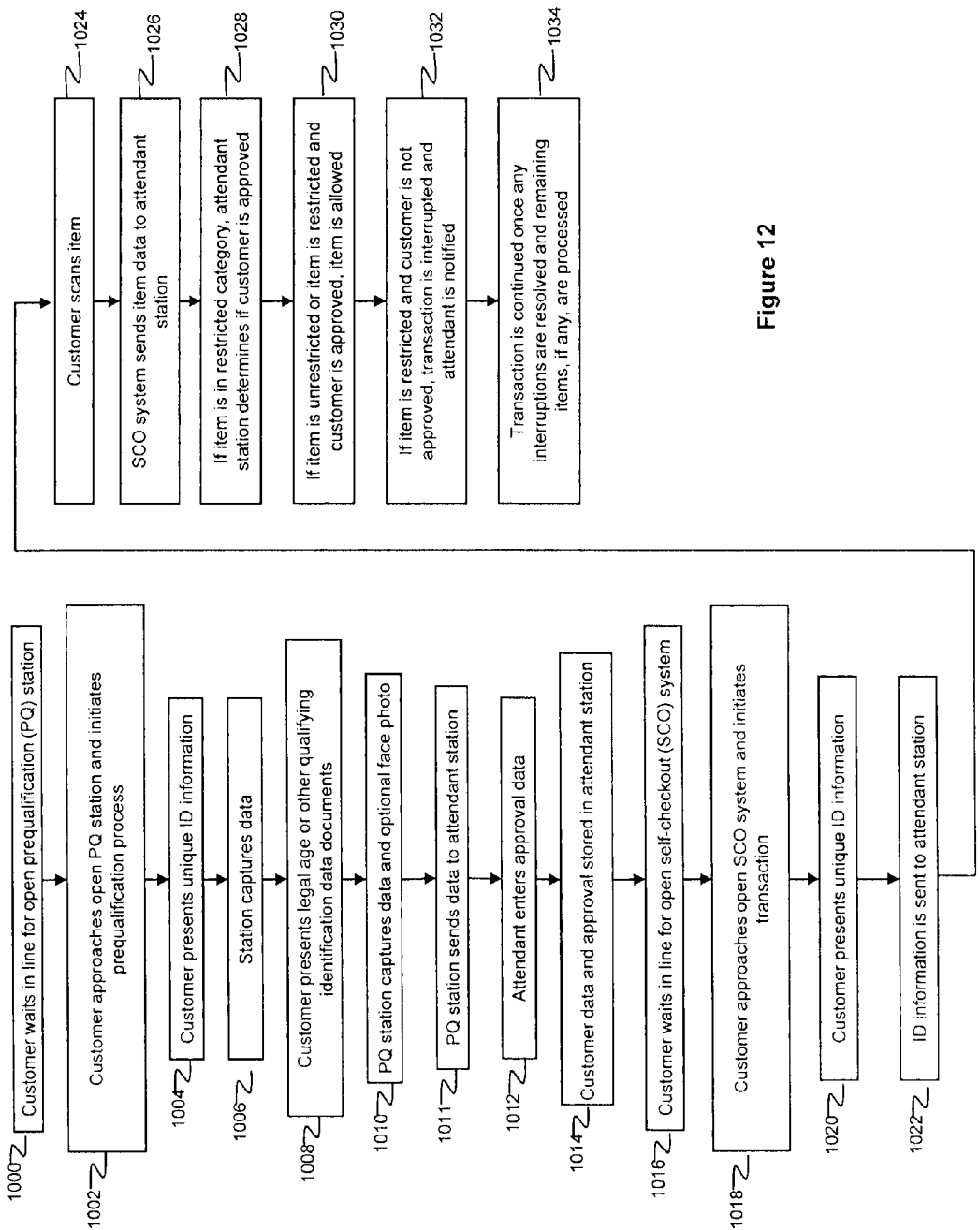
FIG. 12 is a schematic diagram of another process for using an information gathering and decoding apparatus.

FIG. 12 is a flowchart of a process similar to the processes of FIGS. 8 and 11. A difference between the process of FIG. 12 and the processes of FIGS. 8 and 11 is that the process of FIG. 12 has the PLU database residing on the attendant station 170. Therefore, PLU lookup, restricted item recognition, and purchasing determinations for restricted items are preferably performed by the attendant station 170. Otherwise, the process of FIG. 12 generally follows the processes of FIGS. 8 and 11 as described below.

The process of FIG. 12 is not limited to use on the system depicted in FIG. 10, but may be used on other suitable systems, such as the system depicted in FIG. 9, for example. In the embodiment illustrated in FIG. 12, the customer approval data, item lookup, and restriction checking functionalities reside in the attendant station 170. When a customer waiting in line at step 1000 finds an open prequalification station 1135, the customer may begin a prequalification session at step 1002, for example, by standing in a pre-designated spot. At step 1004, the customer presents identifying information, such as the particular store's customer loyalty card, the customer's face, a PIN, or other suitable identifying information, to the data capture device 145 in the prequalification station 1135. The customer may also enter identifying information manually through an input device 154, or in another suitable manner, at step 1004.

When the customer presents identifying information to the prequalification station 1135, the prequalification station 1135 captures data from the identifying information at step 1006. The customer may then present an identification containing qualifying information, such as data that verifies the customer's age, at step 1008. For example, the customer presents unique identification at step 1008, such as a driver's license or passport; and an image of the customer's visage may also be captured by a camera 146 for record keeping or for use in a face recognition system.

The prequalification station 1135 preferably captures the qualifying information, captures a facial image, or both, at step 1010. The prequalification station 1135 preferably associates the customer's identifying information with the customer's qualifying information, for example, through a database record, pointer, or link. The prequalification station 1135 transmits one or more of the captured identifying information, qualifying information, or facial image to the attendant station 170 at step 1011. At step 1012, an attendant at the attendant station 170 may enter approval or rejection information, based on one or more of the transmitted and associated identifying information and qualifying information, facial image, or a criterion such as perceived customer age. Alternatively, software, hardware, or both, on the attendant station 170 may generate approval or rejection information based on one or more of the transmitted and associated identifying information and qualifying information, facial image, or a criterion such as perceived age. One or more of the captured unique identification, age verification data, facial image, or approval or rejection information is stored in the attendant station 170 at step 1014.

After using the prequalification station 1135, the customer may wait until a self-checkout station 100 is available at step 1016. To begin a self-checkout transaction, the customer preferably presents some identifying data, such as a customer loyalty card, a PIN number, or the customer's face to the self-checkout system 100 at steps 1018 and 1020. The self-checkout system 100 preferably captures identifying data at step 1022 and transmits the identifying data to the attendant station 170 for comparison against the stored identifying information to retrieve one or more of the qualifying information, facial image, or approval or rejection information.

During the purchasing transaction, the customer scans items using the self-checkout station 100 at step 1024. Data from a scanned item is transmitted to the attendant station 170 to perform lookups in a locally stored copy of the merchant's price lookup ("PLU") database for each item scanned at step 1026. Restriction flags associated with controlled items may also be stored locally on the attendant station 170. If a particular item scanned at the checkout lane is associated with a restriction flag in the PLU database indicating an age limitation for purchasing the scanned item, the attendant station 170 may compare retrieved approval/rejection information against the restriction requirements at step 1028.

If the attendant station 170 determines that the customer may purchase the restricted item, the self-checkout station 100 is notified by the attendant station 170 and the self-checkout station 100 preferably permits the transaction to continue at step 1030. Otherwise, at step 1032, the attendant station 170 may send a message or code to the self-checkout station 100 that the issue must be resolved by the attendant's action. If a message or code is transmitted at step 1032, normal self-checkout processing continues at step 1034 once the attendant and the customer resolve the issue regarding whether the customer may purchase the restricted item.

Thus, embodiments of information gathering and decoding apparatuses that may permit multiple information gathering devices to be used simultaneously without modifying a point of sale system or using expensive hand-held data capture devices and embodiments of an information gathering and decoding apparatus that may permit customer information to be collected prior to transacting purchases of restricted items have been shown and described. In certain of those embodiments, the collected customer information may be used to facilitate purchasing transactions for restricted items, especially when a self-checkout station is used for the purchasing transaction. Though the present invention has been set forth in the form of its preferred embodiments, it is intended, and will be obvious to those having skill in the art, that many modifications may be made to the above-described systems and methods without departing from the principles of the invention.

The invention claimed is:

1. A data reading system to obtain, from multiple data readers at a retail establishment having checkout and pre-checkout locations, transaction data identifying items of merchandise associated with transactions of multiple customers, the data reading system comprising:

a point of sale system of the retail establishment, the point of sale system having an interface dedicated for use with a single data reader coupled to the interface at the checkout location, the point of sale system configured to receive the transaction data through the interface and ascertain from which of the multiple data readers the transaction data originated;

a first data reader of the multiple data readers, the first data reader acting as the single data reader configured to use the interface of the point of sale system, the first data reader including:
a first data capture device configured to capture first data of the transaction data, the first data representing items of a first transaction of a first customer completing the first transaction at the checkout location,
a first controller including a memory, the first controller and memory operatively connected to the first data capture device, and
a first communication device, the first communication device operatively connected to the first controller; and a second data reader of the multiple data readers, the second data reader comprising a hand-held device configured to communicate, while the first and second data readers are communicatively coupled directly to each other at the retail establishment, only with the first data reader, the second data reader including:
- a second data capture device configured to capture identifying information and second data of the transaction data, the second data representing items of a second transaction of a second customer undertaking the second transaction at the pre-checkout location,
- a second controller operatively connected to the second data capture device and configured to associate the identifying information with the second data, and
- a second communication device operatively connected to both the second controller and the first communication device and configured to transmit the second data and associated identifying information only to the first communication device;

wherein the first controller is configured to:
- receive the first data originating from the first data reader,
- receive the second data and associated identifying information originating from the second data reader,
- store in the memory, based on the associated identifying information, the second data and associated identifying information, and
- transmit to the point of sale system the transaction data so that, from the viewpoint of the point of sale system, the transaction data, representing the first and second transactions, appears as originating from the first data reader and the point of sale system associates the identifying information with the second transaction to ascertain from which of the multiple data readers the second data originated.

2. The data reading system according to claim 1, further including a charging module associated with the first data reader, the charging module operatively connected to the first controller, a first power source also operatively connected to the charging module, and a second power source associated with the second data reader and configured to be recharged by the charging module.

3. The data reading system according to claim 1, wherein the first communication device is a first wireless transceiver and the second communication device is a second wireless transceiver, wherein the first and second communication devices are configured to send and receive data to and from one another.

4. The data reading system according to claim 1, wherein the first controller is further configured to receive, at substantially the same time, the first data originating from the first data capture device and the second data originating from the second data capture device.

5. The data reading system according to claim 1, wherein the first controller is further configured to provide to the point of sale system, in response to the first data reader receiving the associated identifying information, the second data received from the second data reader and stored in the memory so as to cause the point of sale system to initiate processing the second transaction.

6. The data reading system according to claim 1, further comprising:
- a first housing for the first data reader, wherein the first data capture device is located within the first housing, and wherein the first controller and the memory are located within the first housing; and
- a second housing for the second data reader, wherein the second data capture device is located within the second housing, the second controller is in the second housing, and the second communication device is located within the second housing.

7. The data reading system according to claim 1, wherein the associated identifying information comprises a customer rewards number, and wherein the second controller is configured to associate the customer rewards number with the second data.

8. The data reading system according to claim 1, wherein the associated identifying information comprises a unique identifier assigned to the second customer in a checkout line, and wherein the second controller is configured to associate the unique identifier with the second data.

9. The data reading system according to claim 1, wherein the first data capture device comprises a fixed data capture device rigidly fastened to a checkstand.

10. The data reading system according to claim 1, wherein the second data reader is configured to wirelessly communicate with the first data reader.

11. The data reading system according to claim 1, wherein the first data capture device comprises a fixed data capture device rigidly fastened to the point of sale system.

12. The data reading system according to claim 1, wherein the first data reader comprises a fixed data capture device mounted within a self-checkout station.

* * * * *